July 21, 1942.    D. H. CLEWELL    2,290,740
GRAVITY METER
Filed May 24, 1940    2 Sheets-Sheet 2
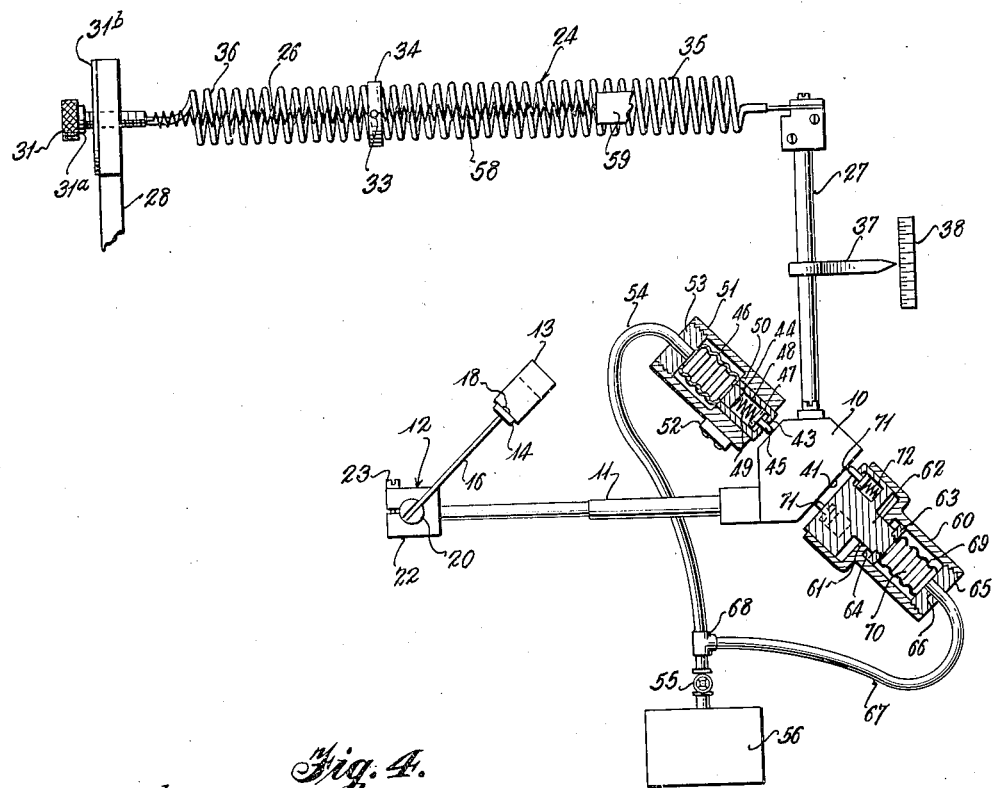
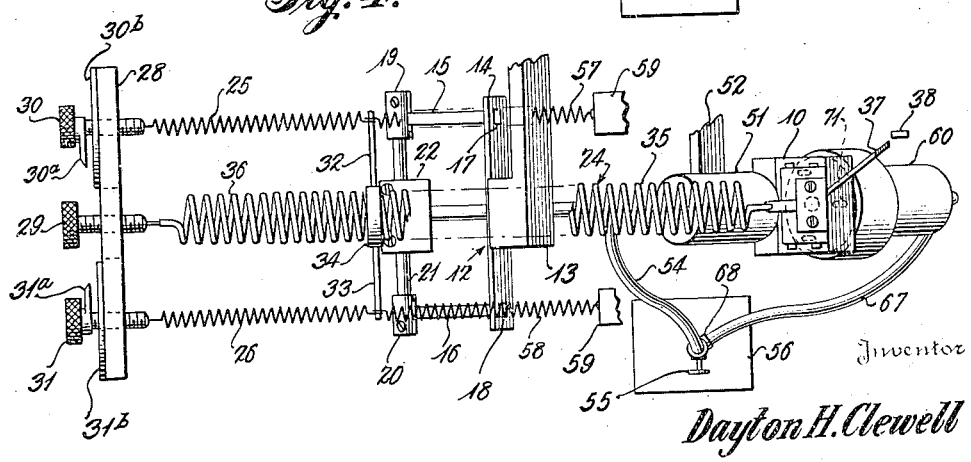
Inventor
Dayton H. Clewell
Dallas R. Lamont
Attorney Patented July 21, 1942

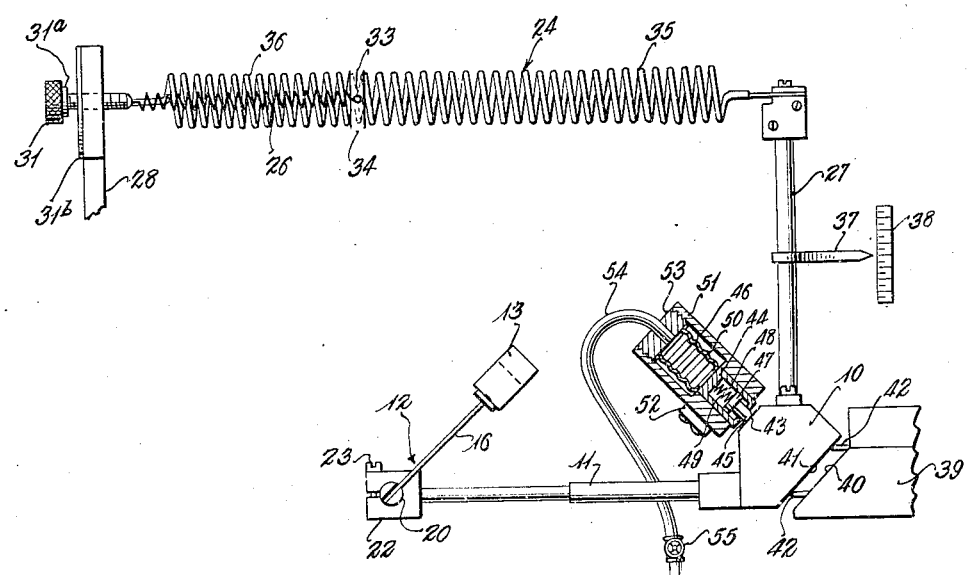
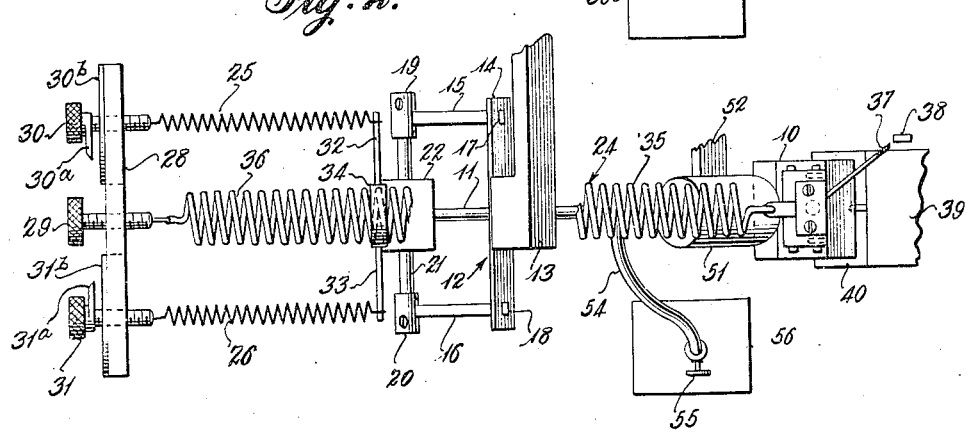

2,290,740

UNITED STATES PATENT OFFICE 2,290,740

GRAVITY METER

Dayton H. Clewell, Dallas, Tex., assignor, by mesne assignments, to Socony-Vacuum Oil Company, Incorporated, New York, N. Y., a corporation of New York Application May 24, 1940, Serial No. 336,897

5 Claims. (Cl. 265—1.4)

This invention relates generally to gravity meters and more particularly to that type of instrument which is used in conducting geophysical surveys by measuring the variations in gravitational force from point to point over an area of the earth's surface.

It has long been known to geologists that in some parts of the world reservoirs of oil are found in the proximity of subsurface structures such as faults, anticlines, or salt domes. It has also long been known to those skilled in the art that variations in the depth of subsurface strata produce detectable variations in gravitational force at the surface of the earth. It has been found that by measuring these small variations in gravitational force from point to point over an area on the earth's surface and plotting this data, a contour map can be produced which will simulate the contours of the subsurface strata. With such a map it is possible to identify or locate discontinuities in the substrata such as an oil-bearing structure.

Due to the minuteness of the variations in gravitational force, very delicate instruments which will accurately indicate variations in these forces that are of a magnitude of approximately one part in ten million, must be employed. Since in conducting a gravitational survey one is only interested in the variations of gravitational force from point to point over an area, it is not feasible to read directly the displacement of the mass due to the variations in gravitational force for each station. It has been found that these surveys can be conducted more expeditiously by employing a null system which measures the energy necessary to return the mass to its zero or base station reading. All of the readings over an area of necessity must be compared to that of a base station for throughout a period of time the physical propertis or characteristics of the delicate elements incorporated in the instrument will change.

Therefore, it is the primary object of this invention to provide a gravity meter that is extremely sensitive to minute changes in gravitational force and which has incorporated therein an accurate null system. Another object of this invention resides in the provision of means for making extremely small changes in the elastic forces exerted upon the mass of a gravity meter. Other objects and advantages will become apparent from the following detailed description when considered with the drawings in which:

Figure 1 is a side elevation of a gravity meter showing a means for effecting minute changes in the elastic forces exerted upon the mass;

Figure 2 is a plan view of the instrument showing the disposition of the minor force exerting means relative to the main elastic means;

Figure 3 is a side elevation of a modification of the null system and clamping means shown in Figure 1; and Figure 4 is a plan view of the apparatus shown in Figure 3.

Referring to the drawings in detail, particularly Figure 1, there is shown a mass 10 provided with a substantially horizontal beam 11 extending to a pivot 12. Pivot 12 which is secured to a support 13 that is fastened to a side of the casing, not shown, of the gravity meter, comprises a relatively stiff spring 14 and two very light leaf springs 15 and 16. The leaf springs 15 and 16 are disposed on opposite sides of the beam 11 but in parallel relationship to each other. Their upper ends are respectively secured to the opposite ends of the stiff spring 14 at 17 and 18. The lower ends of the springs 15 and 16 are secured by means of clamps 19 and 20 respectively to the opposite ends of a rod 21. Beam 11 is rigidly secured to the rod 21 by means of the clamp 22 which can be secured to the rod by means of the screw or bolt 23. The pivotal axis thus formed for the mass 10 and beam 11 lies in a transverse line which crosses springs 15 and 16 at substantially their mid-points. The springs 15 and 16 are solely for the purpose of forming a pivot for the mass 10 and beam 11 and are not intended to exert elastic forces on the beam and mass to aid in supporting it. The mass 10 is elastically supported by means of a horizontally disposed main pretensioned spring 24 and the light auxiliary pretensioned springs 25 and 26. Spring 24 has one of its ends secured to anchorage means carried by a rod 27 that extends substantially vertically upward from the mass 10 a distance approximately that of the distance the main mass is from the pivot point. Arm 27 and beam 11 form right angles with each other. The other end of spring 24 is adjustably anchored to a support 28 that is secured to the casing, not shown, of the gravity meter. This end of the main pretensioned spring is secured to the adjusting screw 29 in axial alignment therewith. Screw 29 passes through and threadedly engages the support 28. Major adjustments which effect displacements of the mass 10 are made by means of the screw 29. This adjustment is effective throughout the length of the main pretensioned spring. Vernier adjustments are then made by altering the tension in one or both of the auxiliary springs 25 and 26 by means of the adjusting screws 30 and 31. Adjusting screws 30 and 31 are secured to the respective ends of springs 25 and 26, in axial alignment. These screws threadedly engage openings in the support 28, and are provided with pointers 30a and 31a that are adapted to cooperate with scales 30b and 31b respectively to indicate the amount of increase or decrease in the tension of the main spring 24 in order to null the mass or return it to its position of zero reading. These scales 30b and 31b can be calibrated in terms of units of gravity and used directly in forming a contour map of the area being surveyed. The opposite ends of springs 25 and 26 are secured to arms 32 and 33 which extend from diametrically opposite sides of a collar 34. Collar 34 is rigidly secured to the pretensioned main spring 24. Adjustment of screws 30 and 31 to change the tension in auxiliary springs 25 and 26 effects an increase in tension in the portion 35 of the main spring 24 and a decrease in the tension in the part 36 of spring 24.

In order to observe the position of the mass 10 a pointer 37 and a cooperating scale 38 are provided. The pointer 37 is secured to and carried by the arm 27 which extends substantially vertically upward from the mass 10. Scale 38 is fixed to the housing, not shown, of the gravity meter. Any conventional optical system can be used to observe the position of the pointer 37 relative to the scale 38.

The extreme minuteness of the variations in gravitational force that are being measured make it necessary that the gravity meter be extremely sensitive and as a result, the elements which support the mass when it is swinging free of the clamps must be extremely delicate. Due to the delicateness of these elements, it is necessary to guard against subjecting them to shocks or extraneous forces which would change their physical constants. To this end there is provided clamping means which comprises a support 39 that is secured to the casing, not shown, of the gravity meter. Support 39 has formed thereon a face 40 which is disposed adjacent and parallel to a similar face 41 formed on the mass 10. Projecting from the face 40 of the support 39 are a plurality of fingers 42 that are adapted to make point contact with face 41 of the mass 10. On the opposite side of the mass from face 41 there is provided a face 43 that is parallel to the face 41. A plunger 44 provided with a resiliently seated pin 45, which makes point contact with the face 43 of the mass 10, is adapted to be hydraulically moved outwardly to cause the pin to bear against the mass and rigidly hold the mass against the fingers 42 that project from the face 40 of the support 39. Plunger 44 in the form of a piston is resiliently biased toward the mass 10 by means of a metal bellows 46. Pin 45 having a head 47 thereon, is recessed in an opening 48 in the plunger 44. The head 47 of the pin is adapted to move along the axis of the opening 48 against the action of a spring 49. The spring 49 is sufficiently strong that the pin is biased to the "out" position at all times but will give, when the point of the pin 45 contacts the mass, so that the point will not be embedded in the face of the mass to create a sticking or freezing condition such that the pin will not immediately leave the mass when the pressure is removed from it.

The plunger 44 is disposed within a cylinder 50 formed in the lower end of a cylindrical casing 51. The cylindrical casing 51 is adapted to be supported by an element 52 that is secured to the casing, not shown, of the gravity meter. The metallic bellows 46 which is secured to the upper end of the plunger 44, extends upwardly to a plug 53 which forms a closure for the upper end of the cylindrical casing 51. The ends of the bellows 46 form fluid-tight seals with the plunger 44 and the plug 53. The plug 53 is provided with a central opening that is adapted to receive a conduit 54. Conduit 54 leads through a valve 55 to a source of fluid pressure 56. An increase of pressure in the conduit will be communicated to the inside of the metal bellows 46 to force the plunger 44 outwardly to cause the pin 45 to contact the face 43 of the mass 10 and force it downwardly against the fingers 42 to rigidly hold it while the instrument is being subjected to extraneous forces or jars that would tend to change the physical characteristics of the delicate suspension elements of the mass. This pressure is maintained in the bellows and conduit 54 by closing the valve 55. When the valve 55 is opened and the pressure in the conduit and chamber within the bellows 46, reduced, the bellows 46 will retract the plunger 44 and hold it in retracted position until the pressure is again increased in the conduit and bellows.

In Figures 3 and 4 there is shown a modification of the null system and hydraulic clamping means. In this form of the device the Cardan suspension principle is employed to null the gravity meter. As shown by the drawings, a second pair of springs 57 and 58 are secured to the outer ends of the arms 32 and 33 respectively in such a manner that the springs are in axial alignment with springs 25 and 26. The other ends of springs 57 and 58 are anchored to a fixed support 59 that is carried by an end wall, not shown, of the gravity meter casing.

This system will operate in the same manner described in connection with the system shown in Figures 1 and 2, differing therefrom in that finer control is obtained.

In the embodiment of the gravity meter illustrated in Figures 3 and 4, a full hydraulic clamping system is used for the mass 10. The fixed support shown in Figures 1 and 2, carrying the fingers 42 against which face 41 of the mass 10 bears, is replaced by hydraulic bearing means. A cylindrical casing 60 suitably secured to a support carried by an end of the gravity meter casing, not shown, is disposed relative to the face 41 of the mass 10 in such a manner that its longitudinal axis is at right angles to the face 41. The cylindrical casing 60 is provided with a cylinder 61 in which is disposed a sliding piston 62. Piston 62 is provided with an enlarged annular head 63 that is adapted to bear on shoulders 64 formed on the inner face of the cylindrical casing 60, when the piston is extended to its outermost position. The cylindrical casing 60 has its lower end enclosed by means of a plug 65 that threadedly engages the inner surface thereof. Plug 65 is provided with a central opening 66 that is adapted to receive a conduit 67 which joins the conduit 54 at the point 68. Disposed within the cylindrical casing between the head 63 of piston 62 and the cylindrical plug 65 is a metal bellows 69. The ends of bellows 69 are in sealed engagement with the face of the piston head 63 and the plug 65 forming a cylindrical chamber 70 within the cylindrical casing 60.

Pressure communicated to the chamber 70 through the conduit 67 will cause the piston 62 to move outwardly until the annular shoulder formed on the head thereof contacts the bearing surface 64 formed on the inner surface of the cylindrical casing. At this point the fingers 71, which are resiliently mounted in the outer face of the piston 62 are either resting against face 41 of the mass 10 or in a position where they are ready to have the mass 10 forced downwardly against them. The fingers 71 are biased outwardly by means of coil springs 72 that are recessed in back of the pins in chambers formed in the face of the piston 62. At least three pins are used to form a bearing surface for face 41 of the mass 10 so that the mass 10 will not have a tendency to pivot sidewise about the clamping elements.

The hydraulic mechanism described above is adapted to cooperate with a second hydraulic mechanism positioned on the opposite side of the mass 10. The second hydraulic mechanism is identical with that shown and described in Figures 1 and 2 and operates in the same manner. The two hydraulic units differ from each other in that the lower one is provided with a weaker bellows 69 than bellows 46 of the upper one so that pressure communicated from the source of supply 56 through the valve 55, the conduit 67 to the chamber 70 will cause piston 62 to move to its outermost position before the piston or plunger 44 of the upper unit starts to move. With such an arrangement, the mass 10 will always be clamped in the same position. Bellows chamber 70 and that defined by the bellows 46 in the upper unit are of the same volume and cross-sectional area. However, the outer faces of the pistons 44 and 62 need not necessarily be the same. In fact, by preference the outer face of piston 62 is made considerably larger in area to accommodate the three pins 71 to give a greater bearing surface on the mass 10.

Although the null system and clamping means have been described in connection with a particular type of mass having a particular form of pivot, it is obvious to those skilled in the art that these novel features are equally applicable to other forms of gravity meters.

Many other detailed features that may be added as refinement to the gravity meter illustrated will immediately become apparent to those skilled in the art, and it is to be understood that the scope of this invention includes the principles of this invention regardless of whether or not these numerous additional features are incorporated.

I claim:

1. In an apparatus for geophysical prospecting by the gravimetric method that comprises gravity responsive means, a support, means for pivotally mounting said gravity responsive means on said support, elastic means for maintaining said gravity responsive means in a state of equilibrium, means for indicating variations in vertical displacement of the gravity responsive means due to variations in the force of gravity acting upon the gravity responsive means, and means for nulling said system, said nulling means comprising additional elastic means acting longitudinally of and directly upon the first elastic means to effect minor displacements of the gravity responsive means, means for varying the stresses in the additional elastic means to increase the stresses in a portion of said first elastic means while decreasing the stresses in the remainder of said first elastic means, and means for indicating the amount of variation of said stresses necessary to bring the mass to a predetermined position to null the system.

2. In an apparatus for geophysical prospecting by the gravimetric method that comprises gravity responsive means, a support, means for pivotally mounting said gravity responsive means on said support, a pretensioned coil spring for elastically maintaining said gravity responsive means in a state of equilibrium, means for indicating variations in vertical displacement of the gravity responsive means due to variations in the force of gravity acting upon the gravity responsive means, and means for nulling said system, said means comprising additional elastic means, means connecting said additional elastic means to said pretensioned coil spring to act directly upon the pretensioned spring to effect minor displacements of the gravity responsive means, means for varying the stresses in the additional elastic means to increase the stresses in a portion of the pretensioned coil spring while decreasing the stresses in the remainder of said pretensioned coil spring, and means for indicating the amount of variation of said stresses in the additional elastic means necessary to bring the mass to a predetermined position to null the system.

3. In an apparatus for geophysical prospecting by the gravimetric method that comprises gravity responsive means, a support, means for pivotally mounting said gravity responsive means on said support, elastic means for maintaining said gravity responsive means in a state of equilibrium, means for varying the stresses in the elastic means to vary the sensitivity of the gravity responsive means to the action of gravitational forces, means for indicating variations in vertical displacement of the gravity responsive means due to variations in the force of gravity acting upon the gravity responsive means, and means for nulling said system, said means comprising additional elastic means, means connecting said additional elastic means to said first elastic means to act directly upon the first elastic means to effect minor displacements of the gravity responsive means by increasing the stresses in a portion of the first elastic means while decreasing the stresses in the remainder of said first elastic means, means for varying the stresses in the additional elastic means, and means for indicating the amount of variation of the stresses in the first recited elastic means necessary to bring the mass to a predetermined position to null the system.

4. In an apparatus for geophysical prospecting by the gravimetric method that comprises gravity responsive means, a support, means for pivotally mounting said gravity responsive means on said support, a pretensioned coil spring for elastically maintaining said gravity responsive means in a state of equilibrium, means for indicating variations in vertical displacement of the gravity responsive means due to variations in the force of gravity acting upon the gravity responsive means, and means for nulling said system, said means comprising a collar rigidly secured to the pretensioned coil spring at a point intermediate the ends thereof, arms extending outwardly from diametrically opposite sides of the collar, a pair of light coil springs each being secured at one of their ends to the respective arms carried by the collar, the light coil springs extending parallel to the pretensioned coil spring to a support, means for independently and adjustably securing the free ends of the light springs to the support, and means cooperating with each of the adjusting means for indicating the amount of effort imparted to the light springs to null the gravity meter system.

5. In an apparatus for geophysical prospecting by the gravimetric method that comprises gravity responsive means, a support, means for pivotally mounting said gravity responsive means on said support, a pretensioned coil spring for elastically maintaining said gravity responsive means in a state of equilibrium, means for indicating variations in vertical displacement of the gravity responsive means due to variations in the force of gravity acting upon the gravity responsive means, and means for nulling said system, said means comprising a collar rigidly secured to the pretensioned coil spring at a point intermediate the ends thereof, a plurality of arms extending radially from the collar, a plurality of elastic means having one end of each secured to the respective arms of the collar and the other ends to a support, an additional equal number of elastic means respectively secured at one end to the arms on said collar and extending in axial alignment with the first elastic means and parallel to the pretensioned coil spring to a support, means for adjustably securing the free ends of the additional elastic means to the support, means associated with the adjusting means for indicating respectively the amount of effort impartable through the adjusting means to the elastic means to null the gravity meter system.

DAYTON H. CLEWELL.